United States Patent
Goergen et al.

(10) Patent No.: US 12,357,935 B2
(45) Date of Patent: Jul. 15, 2025

(54) FILTER MODULE WITH RADIO-FREQUENCY IDENTIFICATION TAG FOR TUNING A FILTRATION SYSTEM

(71) Applicant: PURAFIL, INC., Doraville, GA (US)

(72) Inventors: Jeff Goergen, Warren, MI (US); Erik Ward, Buford, GA (US); Ricardo Gonzalez, Valparaiso, IN (US); Kent Kekeis, St. John, IN (US)

(73) Assignee: Purafil, Inc., Doraville, GA (US)

( * ) Notice: Subject to any disclaimer, the term of this patent is extended or adjusted under 35 U.S.C. 154(b) by 142 days.

(21) Appl. No.: 17/806,878

(22) Filed: Jun. 14, 2022

(65) Prior Publication Data

US 2023/0398482 A1 Dec. 14, 2023

(51) Int. Cl.
*B01D 46/00* (2022.01)
*B01D 46/42* (2006.01)
*B01D 46/44* (2006.01)
*B01D 46/46* (2006.01)
*G06K 7/10* (2006.01)

(52) U.S. Cl.
CPC ....... *B01D 46/009* (2013.01); *B01D 46/0086* (2013.01); *B01D 46/429* (2013.01); *B01D 46/442* (2013.01); *B01D 46/444* (2013.01); *B01D 46/446* (2013.01); *B01D 46/46* (2013.01); *G06K 7/10366* (2013.01); *B01D 2201/52* (2013.01)

(58) Field of Classification Search
None
See application file for complete search history.

(56) References Cited

U.S. PATENT DOCUMENTS

| | | | |
|---|---|---|---|
| 9,370,763 B2 | 6/2016 | England | |
| 10,955,150 B2 * | 3/2021 | Fox | F24F 3/044 |
| 2009/0045913 A1 * | 2/2009 | Nelson | G06K 7/0008 340/539.11 |
| 2009/0102612 A1 * | 4/2009 | Dalbow | G16H 10/60 340/10.4 |
| 2012/0151889 A1 * | 6/2012 | Horey | B01D 46/009 55/467 |
| 2017/0341001 A1 * | 11/2017 | Jousma | B01D 46/0086 |
| 2019/0209957 A1 * | 7/2019 | Silvestro | B01D 46/70 |
| 2019/0247774 A1 * | 8/2019 | Röckle | B05B 14/43 |
| 2020/0188835 A1 | 6/2020 | England | |
| 2022/0379689 A1 * | 12/2022 | Masseni | B60H 3/0616 |

FOREIGN PATENT DOCUMENTS

JP  2004183925 A  *  7/2004

OTHER PUBLICATIONS

JP2004183925A_ENG (Espacenet machine translation of Kawai) (Year: 2004).*

* cited by examiner

*Primary Examiner* — Gabriel E Gitman
(74) *Attorney, Agent, or Firm* — Kilpatrick Townsend & Stockton LLP (57) ABSTRACT

Techniques for filtration systems are disclosed. In an example, a filtration system interrogates, via a radio-frequency identification (RFID) access device, a RFID tag that is positioned on a filter module that is positioned in the filtration system. In response to interrogating the RFID tag, the filtration accesses, an operational parameter stored on the RFID tag and associated with the filter module. The filtration adjusts an operational setting of the filtration system based on the operational parameter. The filtration system operates the filtration system based on the adjusted operational setting.

22 Claims, 8 Drawing Sheets

FILTER MODULE WITH RADIO-FREQUENCY IDENTIFICATION TAG FOR TUNING A FILTRATION SYSTEM

TECHNICAL FIELD

The present invention relates generally to methods of using Near-Field Communication (NFC) to control filtration devices, and more specifically, but without limitation, relates to methods of using NFC to communicate, adjust, and track operating parameters of filtration devices to ensure effective removal of impurities from fluid streams.

BACKGROUND

Toxic, carcinogenic, corrosive, odorous, and otherwise offensive contaminants can be removed from fluids (i.e. gases and liquids) by filtration using a variety of techniques. These techniques include wet scrubbing, gas-phase, and particulate filtration. The filtration media can be dry-scrubbing adsorptive, absorptive, and/or chemically impregnated, and the removal can involve physical adsorption or chemical adsorption. As opposed to some other methods, gas-phase filtration does not consume large quantities water or fuel. Dry-scrubbing media can be engineered from a number of common adsorbent materials with or without chemical additives to control a broad spectrum of contaminants or tailored for specific contaminants.

Undesirable compounds are present in many fluids commonly encountered by humans and animals, such as air and water (e.g., indoor air or a drinking water supply). Airborne contaminant gases, particularly acid gases and/or ammonia gas, can emanate from processes such as the combustion of fossil fuels, acid rain, industrial processes, waste incineration, industrial accidents, and biological functions. Volatile organic compounds (VOCs), in addition to being present in industrial environments, often are present in offices and living spaces, where they are released into the air from new furnishings, wall coverings, and office equipment such as photocopy machines. When airborne contaminants are present in a confined area, such as inside a vehicle, office, or home, the risk associated with exposure increases. Airborne contaminants can have a detrimental effect on the local environment and pose health hazards, particularly for children, the elderly, and individuals with asthma or lung disease. Airborne contaminants also can have deleterious effects on museum artifacts, historical documents, building structures, information technology machines and infrastructure, and esthetic applications.

A higher quantity of airborne contaminants are encountered by some professions than by others. For example, fire professionals, mining professionals, construction professionals, and the like frequently encounter multiple different types of airborne contaminants that may be toxic, carcinogenic, or otherwise undesirable. Air filtration devices are employed to remove airborne contaminants from certain environments and/or to prevent or inhibit airborne contaminants from entering certain environments, such as homes, offices, vehicles, and other enclosed spaces. As an example, air filtration devices are employed to remove airborne contaminants from and/or to prevent or inhibit airborne contaminants from entering emergency vehicles, thereby protecting the first responders and other passengers inside the vehicles. Filters and filtration systems can be used to remove or reduce undesirable compounds, as long as the filtration media remains effective. Using expired or expended filters, however, often fails to adequately reduce a toxic or carcinogenic nature of a contaminated fluid. Thus, it is critical to know when a filter has reached the end of its useful life so that it can be replaced.

Ensuring that a filtration system effectively cleans a fluid stream can be complicated and depends on several variables including: the space or fluid stream in which the filtration system is placed, characteristics of the filter module installed in the system, the rate at which the fluid is processed through the filtration system, the amount of time the filter module has been installed, the amount of time the filtration system has operated, and/or a combination of these and other variables.

For a given filtration system, operational settings, such as air flow rate, that are ideal for one type of filter module, media or application environment may not be ideal for a different type of filter module, media, or application environment. Using incorrect system settings for a given filter module, media, or environment can cause poor performance and/or early exhaustion of the filtration media in the other type of filter module, media, or application environment. Hence, new solutions are needed.

SUMMARY

In an example, a filtration system includes a housing with an opening sized to receive a radio-frequency identification (RFID) filter module, the filter module including a filtration media and an RFID tag; the filtration system also including an RFID access device communicatively couplable to the RFID tag and positioned or positionable proximate to the opening for the RFID filter module for interrogating the RFID tag when the RFID tag is installed; a device configured to operate at least one function of the filtration system; and a processor. The processor is configured to perform operations. The operations include causing the RFID access device to interrogate the RFID tag. The operations include accessing, in response to interrogating the RFID tag, an operational parameter stored on the RFID tag and associated with the filtration media. The operations include adjusting an operational setting of the filtration system based on the operational parameter.

In another example, a system includes a filter module including filtration media and a Near Field Communication (NFC) tag that includes one or more operational parameters relating to the filter module; and a filtration system. The filtration system includes a housing having an opening sized to receive the filter module. The filtration system further includes a NFC access device communicatively couplable to the NFC tag and positioned or positionable proximate to the opening for the filter module for interrogating the NFC tag when the filter module is installed. The filtration system further includes a device configured to operate at least one function of the filtration system. The filtration system includes a processor configured to perform operations. The operations include causing the NFC access device to interrogate the NFC tag. The operations include accessing, in response to interrogating the NFC tag, an operational parameter stored on the NFC tag and associated with the filtration media. The operations include operating the filtration system based on the operational parameter.

In an example, a method includes interrogating, from a radio-frequency identification (RFID) access device in a filtration system, a RFID tag that is positioned on a filter module that is positioned in the filtration system. The method includes accessing, in response to interrogating the RFID tag, an operational parameter stored on the RFID tag and associated with the filter module. The method further includes adjusting an operational setting of the filtration system based on the operational parameter. The method further includes operating the filtration system based on the adjusted operational setting.

While the above examples are discussed as computer-implemented methods, it will be appreciated that the above functionality can be implemented in a system such as a computer system and/or as computer-executable instructions stored on a non-transitory computer-readable medium.

DETAILED DESCRIPTION

Disclosed herein are filtration systems that use Near-Field Communications (NFC) technology. Techniques relating to filter modules and the filtration systems, including the systems and methods of using both are disclosed. For example, a filtration system can use filter modules that include one or more NFC tags that can electronically communicate with one or more components of the filtration system. Information stored on the tags can be accessed by one or more NFC readers present in the filtration system. The retrieved information can be used to tune the filtration system to ensure effective and efficient performance. Accordingly, disclosed NFC filter modules enable improved efficiency and effectiveness over the life of a filtration media compared to filter modules without the NFC tag. For instance, such filter modules can ensure the filtration system operates efficiently and effectively over the entire useful life of the filter, to accurately predict end of life of the filtration media, and to prevent further use of the filter when the filtration media's capacity for contaminant capture becomes exhausted.

In another example, a filtration system may need to operate differently or limit certain user inputs, depending on the operating environment of the filtration system. As one example, for safety reasons, a user's ability to make changes to the operating parameters of a filtration system inside a vehicle might need to be limited if the vehicle is in motion. In another example, a filtration device may be used only sporadically or may be used in different environments with varying levels of contaminants, making it difficult to estimate the time to end of life. In another example, a filtration system could be configured with several possible fan speed settings, each of which is intended to represent a specific air flow rate through the system. But the speed settings would provide the intended flow rate only if the correct filter type is installed. If a different type of filter is installed, the flow rate achieved at each setting might not be the intended flow rate and the actual flow rate would be unpredictable.

One example of NFC is Radio Frequency Identification (RFID). But other examples are possible. For instance, the filter modules described herein can use RFID or any equivalent technology, provided the electronic communication module is capable of functioning as described herein for the RFID tag.

The RFID tags described herein can be pre-programmed to include certain data related to the corresponding filter module and its use. The RFID tag can be a passive RFID tag (without power source) or an active RFID tag (with power source), depending on the intended application for the filter module. For example, the RFID tag can be a passive RFID tag that includes a radio transponder, a radio receiver, a transmitter, and/or any other suitable components for an RFID tag. An active RFID tag may include a power source such as a battery.

Data stored on the RFID tags can include but is not limited to identification of the source (e.g., manufacturer) of the RFID filter module and one or more operational parameters. Examples of operational parameters include whether or not the RFID filter module is expended or expired, and/or data indicating the remaining useful life of the filter module or from which the remaining useful life can be determined. Other examples of operational parameters include preferred settings (e.g., air flow rate) for the particular filter module that is installed. The data can be used to override default filtration system settings, so the preferred filter module settings are used. For example, if a filtration system is programmed to use default operational parameters different from those stored on the RFID filter module, upon interrogation of the RFID tag by a component of the filtration system and receipt of data from the RFID tag, the filtration system adopts the operational parameters of the RFID filter module. Thus, the RFID tag on the RFID filter module ensures the RFID filter module is used with appropriate settings for efficient and effective filtration.

Additional examples of operational parameters include performance parameters and operational settings. As used herein, the term "performance parameters" refers to various quantitative and measurable indications of filtration system performance, such as but not limited to static pressure drop across the filter module, change in air flow rate across the filter module, a measure of the purity of the air leaving the filtration module, operational temperature, elapsed installed time, elapsed operational time, cumulative air flow through the filter module, estimated time to end of life, and/or any other suitable measure of system performance. As used herein, the term operational settings refers to various filtration system settings that can be selected and/or adjusted to achieve desired system operation. Operational settings include, but are not limited to a fan speed; a rate of air flow across the filter module, at or across a certain point in the system, or across the entire system; or any other suitable operational setting. Optionally, operational settings can be adjusted to manipulate, and ideally to improve, performance parameters.

For ease of description, certain examples described herein refer to air filtration and devices and systems for air filtration; however, persons skilled in the art understand how to adapt the concepts described herein for filtration of other gases and filtration of liquids.

The following illustrative examples are given to introduce the reader to the general subject matter discussed herein and are not intended to limit the scope of the disclosed concepts.

The following sections describe various features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

Figure 1:
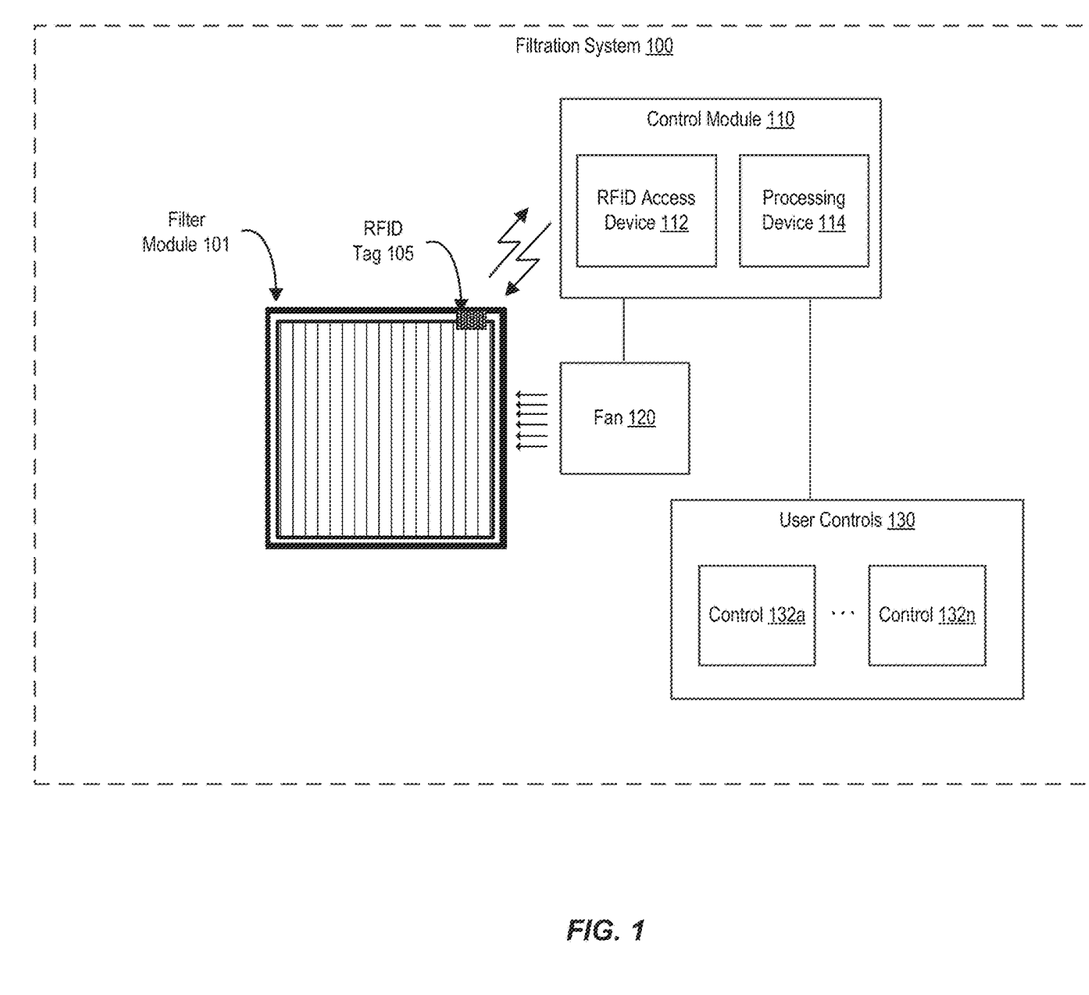
FIG. 1 is a block diagram of an air filtration system employing Near-Field Communication (NFC) technology, according to one example of the present disclosure.

FIG. 1 is a block diagram of a filtration system 100 employing Near-Field Communication (NFC) technology, according to one example of the present disclosure. Filtration system 100 includes filter module 101, control module 110, fan 120, and user controls 130. In the example depicted in FIG. 1, filter module 101 includes RFID tag 105, which, when placed within proximity to RFID access device 112, can be interrogated by RFID access device 112 to obtain one or more parameters which can be used by processing device 114 to control fan 120 in conjunction with user controls 130.

Filter module 101 is used to remove undesirable compounds, such as toxic compounds, carcinogenic compounds, and the like, from air. Filter module 101 is intended for air filtration; however, in other examples, similar filter modules are suitable for filtering other gases and/or liquids (e.g. water or organic solvents). Filter module 101 includes one or more RFID tags 105 or similar electronic devices. RFID tag 105 can be read from or written to by RFID devices. RFID tag 105 can be an active or passive device.

Figure 8:
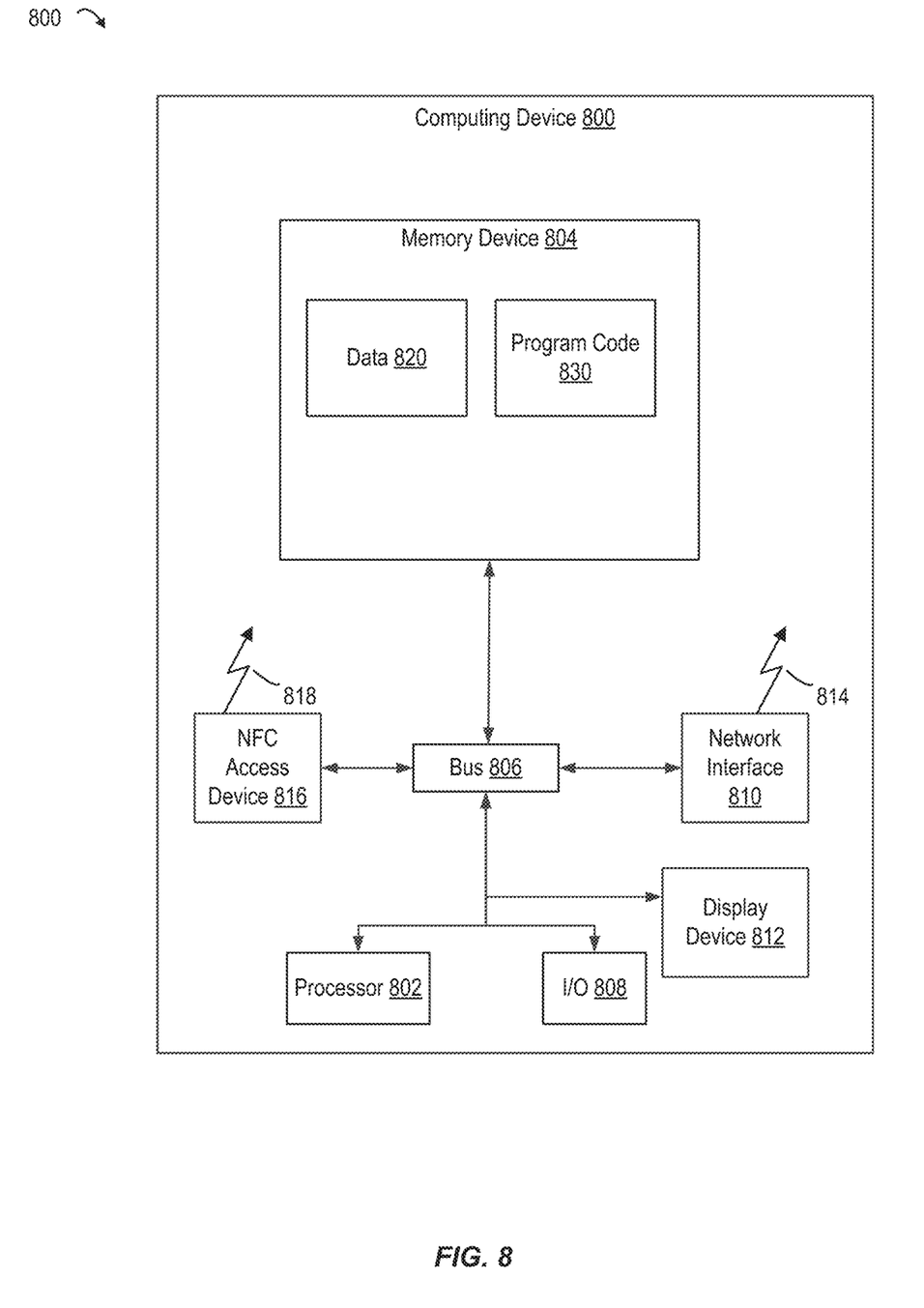
FIG. 8 illustrates an exemplary computing device for use in a control module of an air filtration system, according to one example of the present disclosure.

Control module 110 includes processing device 114, an example of which is discussed further with respect to FIG. 8. Control module 110 also includes RFID access device 112, which is configured to read data stored in and write data to RFID tag 105. In the case of a passive RFID tag, RFID access device 112 can generate electromagnetic energy sufficient to energize RFID tag so that the tag can read or write data as appropriate and transmit data or other messages back to RFID access device 112. While control module 110 is described, any component having an RFID reader can interrogate and receive transmissions from the RFID tag. Thus, the references to a control module communicating with the RFID tag also apply to other components of the filtration system that are configured to communicate with the RFID tag 105.

RFID tag 105 can include pre-programmed operational parameters, including target performance parameters and default operational settings for the specific filter module 101 present in the system. Optionally, the default operational settings for the filter module 101 on the RFID tag 105 can override any pre-existing filtration system settings, so preferred settings are used for the filter module 101 that is present in filtration system 100. If filtration system 100 is equipped to measure and/or store system operational parameters (i.e., of the system during operation), those measured operational parameters can be compared to the target performance parameters stored on the RFID tag 105. Such a comparison can indicate how effectively and efficiently the system is operating. For instance, if filtration system 100 is not operating as efficiently and effectively as possible, one or more operational settings, such as a fan speed, can be adjusted to improve one or more measured performance parameters. Optionally, the RFID tag 105 or another component of filtration system 100 can track or determine certain measured operational parameters, such as installed time, operational time, cumulative air flow through the filter, and/or estimated time to end of life.

RFID tag 105 may be read-only or read-write. In the read/write case, a component of the filtration system can write and store system-use data to RFID tag 105. If RFID tag 105 is read/write, the system can write actual, measured, tracked, or calculated operational parameters to the tag while the filter module 101 is installed and the filtration system is in use. In that case, the RFID tag 105 can include both pre-programmed operational parameters and actual, measured operational parameters.

In some examples, the RFID tag 105 is tamper-proof. In those examples, if the RFID tag has been tampered with or altered after manufacturing, a component of the filtration system that attempts to retrieve data from the RFID tag will reject the data received from the RFID tag and will not update the filtration system or any associated parameters based on the data.

Fan 120 is operable to propel or otherwise move air through the filter module 101. But fan 120 is just one example of a device within filtration system 100. Other devices can be included in filtration system 100. For instance, in some examples, the filtration system 100 includes a sensor or other component for measuring one or more performance parameters that indicates a quality of the filtration system performance.

Figure 6:
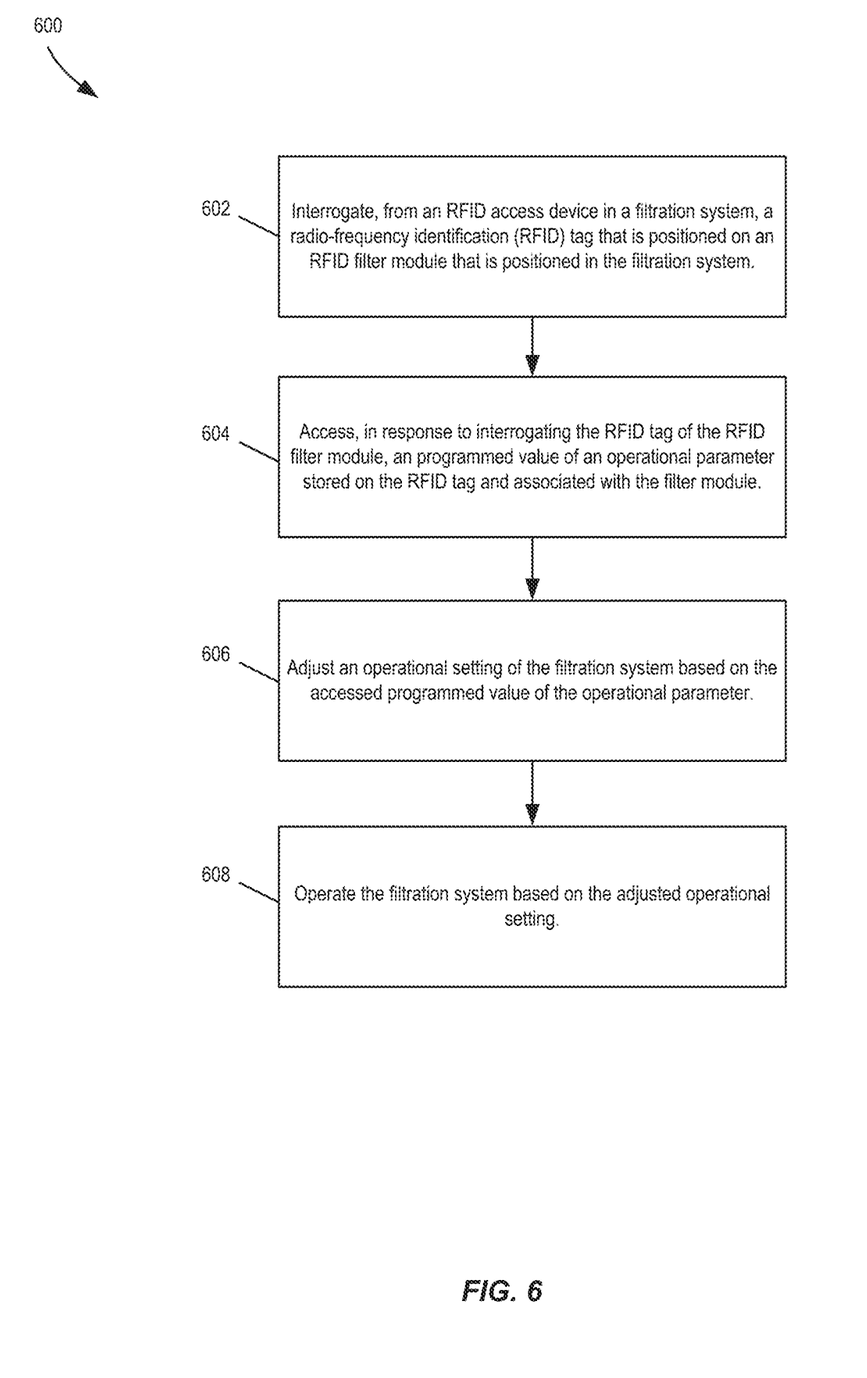
FIG. 6 is a flowchart of a process performed by the air filtration system, according to one example of the present disclosure.

As discussed further with respect to FIG. 6, the filtration system 100 can compare one or more measured performance parameters to one or more target performance parameters stored on the RFID tag 105, and the filtration system 100 adjusts one or more operational settings so the measured performance parameter is closer to the target performance parameter. In another example, upon interrogating the RFID tag, the control module 110 receives information that includes one or more target performance parameters for comparison with one or more measured performance parameters, and the control module 110 compares a target parameter with a measured parameter and adjusts one or more operational settings so the measured performance parameter is closer to the target performance parameter. The target performance parameters may be a static pressure drop, an operational temperature, a change in air flow across the filter module 101, an air purity, and/or any other measurable parameter that indicates a quality of the filtration system performance.

User controls 130 include one or more controls 132a-n. User controls 130 can be installed in close proximity to control module 110, or at any distance therefrom. Additional examples of user controls are shown with respect to FIG. 5.

Figure 2:
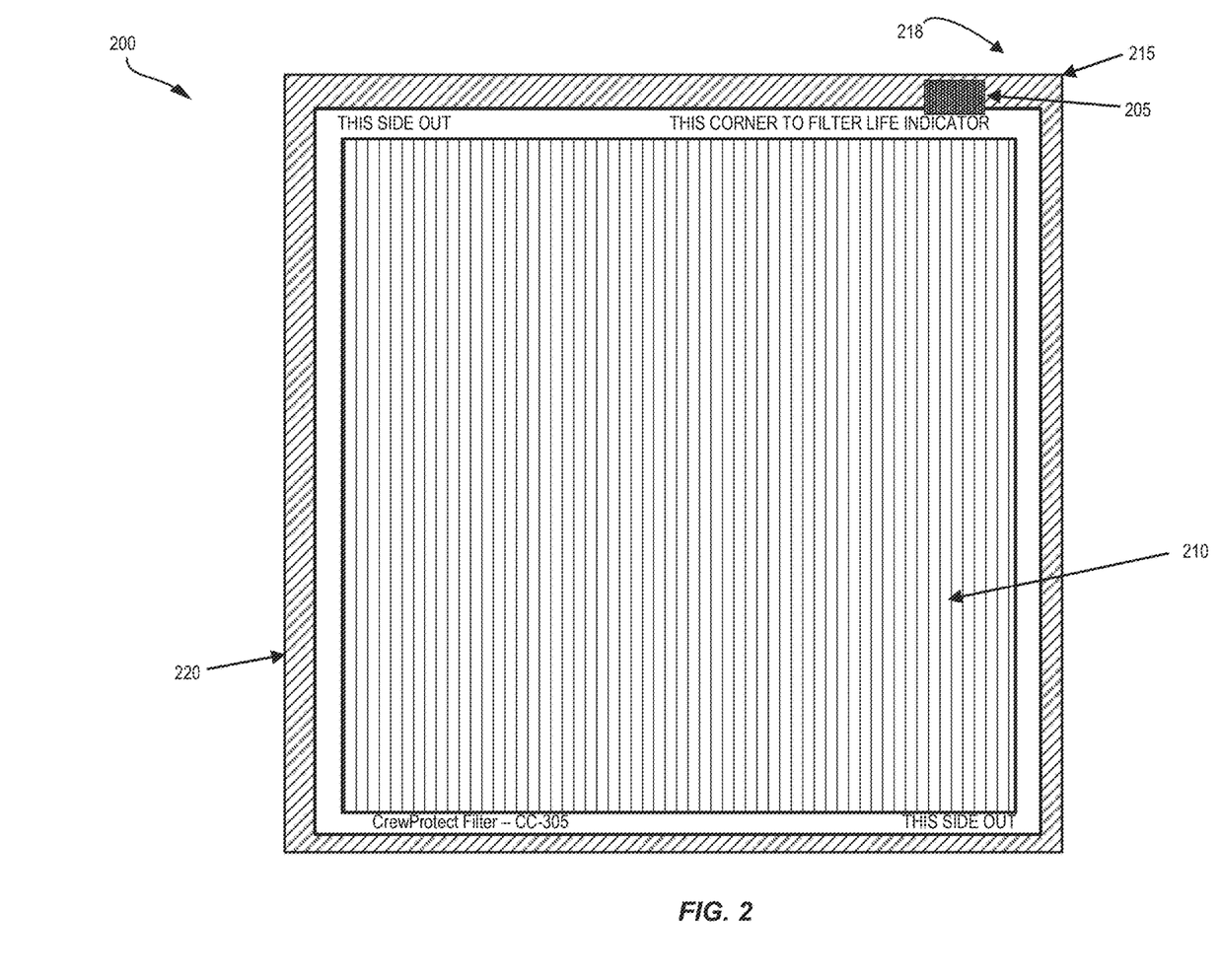
FIG. 2 is a diagram of a filter module, according to one example of the present disclosure.

FIG. 2 is a diagram of a filter module 200 according to one example of the present disclosure. Filter module 200 includes an RFID tag 205, filtration media 210, and, optionally, a frame 220. Filter module 200 is an example of filter module 101. RFID tag 205 is positioned in the upper-right corner of the filter module 200. In other examples, however, the RFID tag 205 is positioned in any other suitable location on the filter module 200, such as other corners of the filter module 200, on any face or along any edge of the filter module 200, etc., provided that when the filter module 200 is installed in a filtration system, the location and orientation of the RFID tag 205 permits wireless communication between the RFID tag 205 and other relevant components of the filtration system, for instance, RFID access device 112 of FIG. 1. For example, the RFID tag 205 is positioned on a first corner 215 or edge 218 of the filter module 200, and the first corner 215 or edge 218 is positioned proximate to the control module (e.g., control module 110) of the filtration system. Other arrangements are possible.

The filtration media 210 is disposed inside the optional frame 220, which is configured to allow air (not shown) to pass through the filter module 200 and to contact the filtration media 210. As illustrated in FIG. 2, the filtration media 210 includes a porous fabric, which is supported by a frame 220 around its periphery. In use, contaminated air passes through the frame 220 and contacts the filtration media 210. The filtration media 210, when in contact with a contaminated fluid, filters or otherwise removes undesirable compounds from the fluid.

The filtration media 210 is not limited to the specific media depicted, and in other examples, the filtration media 210 can be any known filtration media. For example, the filtration media 210 can be a porous substrate, such as but not limited to, activated alumina ($Al_2O_3$), silica gel, zeolite, kaolin, adsorbent clay, activated bauxite, activated carbon (such as activated carbon cloth), particulate filters, fibers, or combinations thereof. Optionally, the porous substrate includes any suitable impregnate. In some examples, the porous substrate is a woven or nonwoven material such as glass fiber, crepe paper, Kraft paper, wool, steel wool, silk, cellulosic fiber fabrics, synthetic fiber fabrics or combinations thereof. In some examples, the filtration media 210 is an impregnated fiber. Suitable filtration media 210 are described in U.S. Pat. No. 9,370,763 and U.S. Patent Application Publication 2020/0188835, each of which are hereby incorporated by reference in their entireties.

When the filtration media 210 includes fibers, individual fibers are arranged such that the individual fibers are in contact and in random orientations to provide a porous membrane. Methods of securing the porous membrane include, but are not limited to, use of adhesives, mounting fibers in a frame or partially melting the fibers and allowing the fibers to solidify as a homogenous network. In one embodiment, the porous membrane (i.e., the filter media) is from about 5 mm to about 500 mm thick. In one embodiment, the porous membrane has a pore size from 50 nm to 200 μm.

The optionally included frame 220 is positioned around the filtration media 210 of the filter module 200. When present, however, the frame 220 is not limited to structures depicted in FIG. 2. In other examples a frame 220 can have any structure suitable for housing a filtration media 210 provided the frame 220 permits fluid to flow through the frame 220 and contact the filtration media 210. Optionally, a frame 220 at least partially surrounds and encloses the filtration media 210 and maintains desired dimensions of an otherwise flexible or flowable filtration media 210. In some examples, the frame 220 is a housing that is substantially solid but perforated. Such a frame 220 can be used, for example, with filtration media 210 that is a particulate, granular, powder, or powder-like material. The frame 220 may be omitted if the filtration media 210 is self-supporting (e.g., such as a bulk solid, fibrous or porous media). The optional frame 220 can be made of cardboard, metal, polymer, ceramic, and/or any other suitable material.

Figure 3:
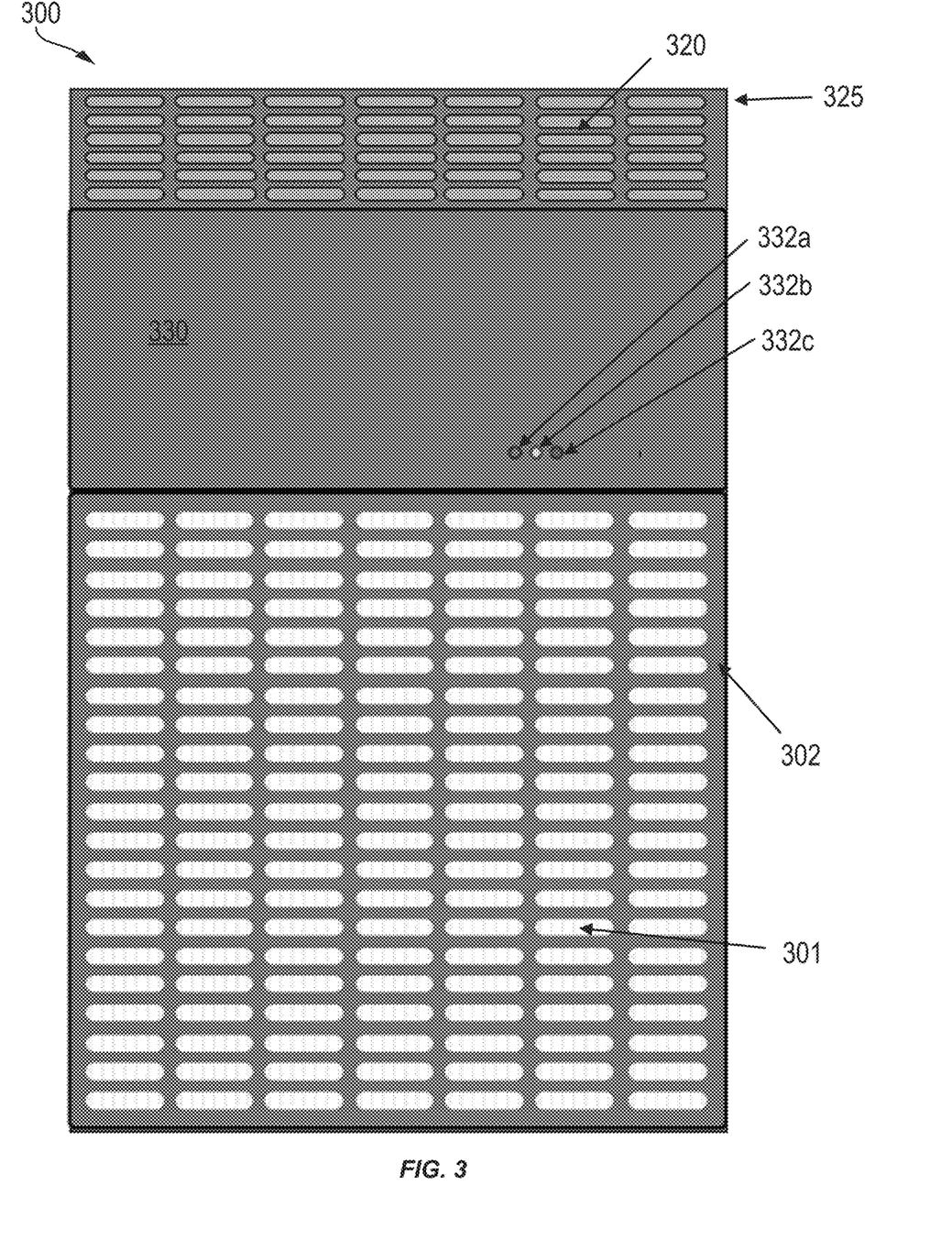
FIG. 3 is a diagram of a filtration system, according to one example of the present disclosure.

FIG. 3 is a diagram of a filtration system 300 according to one example of the present disclosure. The filtration system 300 includes filter module 301, a housing 302, one or more indicator lights 332a, 332b, and/or 332c, corner 325, a control module 330, and a fan 320 (located under the indicated area of housing 302). The control module is also illustrated separately in FIG. 4. In some examples, control module 330 can be upgraded or replaced.

In the example depicted by FIG. 3, control module 330 interrogates an RFID tag on a filter module 301 and receives from the RFID tag data including preferred operational parameters for the RFID filter module. The control module 330 includes one or more RFID access devices (e.g., RFID access device 112; not shown), one or more processors or other computing devices (e.g., processing device 114; not shown) and/or other components that enable the control module 330 to perform various tasks such as but not limited to radio frequency interrogation of the RFID tag 105 and operational control of the filtration system 300. Further detail is provided in FIGS. 1 and 8. The control module 330 is communicatively coupled to the filtration system 300, the fan 320, and/or other suitable components of the filtration system 300.

The control module 330 is positioned in any suitable location in or on the housing 302. As depicted, the control module 330 is integrally formed with the housing 302, but alternatively, the control module 330 can be formed separately and affixed or otherwise coupled to the housing 302. The control module 330 can interrogate the RFID tag 105 of the filter module 301. The control module 330 should be positioned proximate to the filter module 301 to facilitate interrogating the RFID tag 105.

The housing 302 includes openings adjacent to the fan 320 and the filter module 301 to enable the fan 320 to draw air (not shown) into the housing 302 and across or through an RFID filter module (e.g., filter module 301) to remove undesirable components from the air. The filtration system 300 optionally includes any other suitable components for filtering or otherwise removing the undesirable components from air, such as one or more additional fans (not shown). In some cases, filtration system 300 includes other indicators, displays, or a user interface.

The housing 302 can include any suitable material for housing the other components. For example, the housing 302 can be formed from a metallic alloy, a polymeric material, a ceramic material, and/or any other suitable material. In some examples, the housing 302 or any component thereof and/or other suitable components of the filtration system 300 is formed from a material that allows interrogation of an RFID tag (e.g. RFID tag 105) within the RFID filter module by the control module 330. For example, the housing 302 or component thereof can be formed from a metallic alloy, such as a steel alloy, an aluminum alloy, a titanium alloy, or the like, and one or more internal components of the filtration system 300 is formed from a polymeric material, a ceramic material, or other suitable material that allows interrogation of the RFID tag 305 by the control module 330 or other suitable component of the filtration system 300.

The housing 302 forms at least one external surface of the filtration system 300. For example, the housing 302 can be sized to receive the fan 320, the control module 330, the filter module 301, and/or any other components of the filtration system 300. Alternatively, one or more of the other components, such as the control module 330, can be integral with the housing 302 and can combine with the housing 302 to form at least one external surface of the filtration system 300.

The fan 320 and the filter module 301 are disposed in the housing 302. The fan 320 is positioned and oriented to cause air to flow through the filter module 301 such as by applying a static pressure across the filter module 301. For example, as shown in FIG. 3, the fan 320 is positioned at a corner 325 of the filtration system 300 to cause air to flow across or through the filter module 301 for removing the undesirable compounds. In other examples, however, the fan 320 can be located in any position within the housing 302 where the fan 320 can cause air to flow across or through the filter module 301.

The fan 320 can be a traditional fan (e.g., having multiple blades configured to rotate for causing movement of fluid) or any other type of device that is configured to cause air to pass across or through the filter module 301. In some examples, the fan 320 is omitted and/or replaced with a different device or component that facilitates movement of air across or through the filter module 301 for filtering the air.

The filtration system 300 or the control module 330 optionally can display indications of a status and/or performance of a filtration system, such as by indicating the elapsed filter life, the remaining time to end or life, or some other indication. In various embodiments, the control module 330 or the filtration system 300 can include one, two, three, or any number of indicator signals 332 a-c. More details are shown with respect to FIG. 4. The filtration system 300 optionally includes a control pad (shown in more detail with respect to FIG. 5).

In the example depicted, when the fan 320 is activated, the filtration system 300 draws air into the housing 302 and forces the air across or through the filter module 301. Filter module 301 removes undesirable compounds from the air. During use of a filtration system 300 with a filter module 301, the control module 330 (or other filter system component having a RFID reader) interrogates the RFID tag 105 and receives data from the RFID tag 105 where the data includes information about the filter module 301. In some examples, the control module 330 emits an electric field or other suitable type of electrical communication signal, and the RFID tag 105 sends a wireless electronic transmission to the control module 330 responsive to the electrical communication received. The data transmitted to the control module by the RFID tag 105 can be, but is not limited to, information that confirms the filter module 301 is valid, non-expended, and/or non-expired; one or more operational settings or ranges thereof, such as a default fan speed or range; and/or one or more target performance parameters or range thereof, such as a preferred air flow rate.

In some examples, the data includes one or more specific preferred operational settings or ranges thereof, and those settings are applied to and used by the filtration system as received. In other examples, the data includes information from which one or more specific preferred operational settings or ranges can be derived. In that case, the control module or other suitable component of the filtration system, such as a processor, uses the information to derive one or more operational settings, and those settings are applied to and used by the filtration system. In still other examples, the data includes information from which the control module, processor, or other suitable component can determine how to adjust (e.g. increase or decrease) one or more operational settings (e.g., a fan speed) to improve a performance parameter (e.g., purity of filtered air), and the control module, processor, or other suitable component uses the information to determine how to adjust the operational setting and adjusts the operational setting accordingly.

Figure 4:
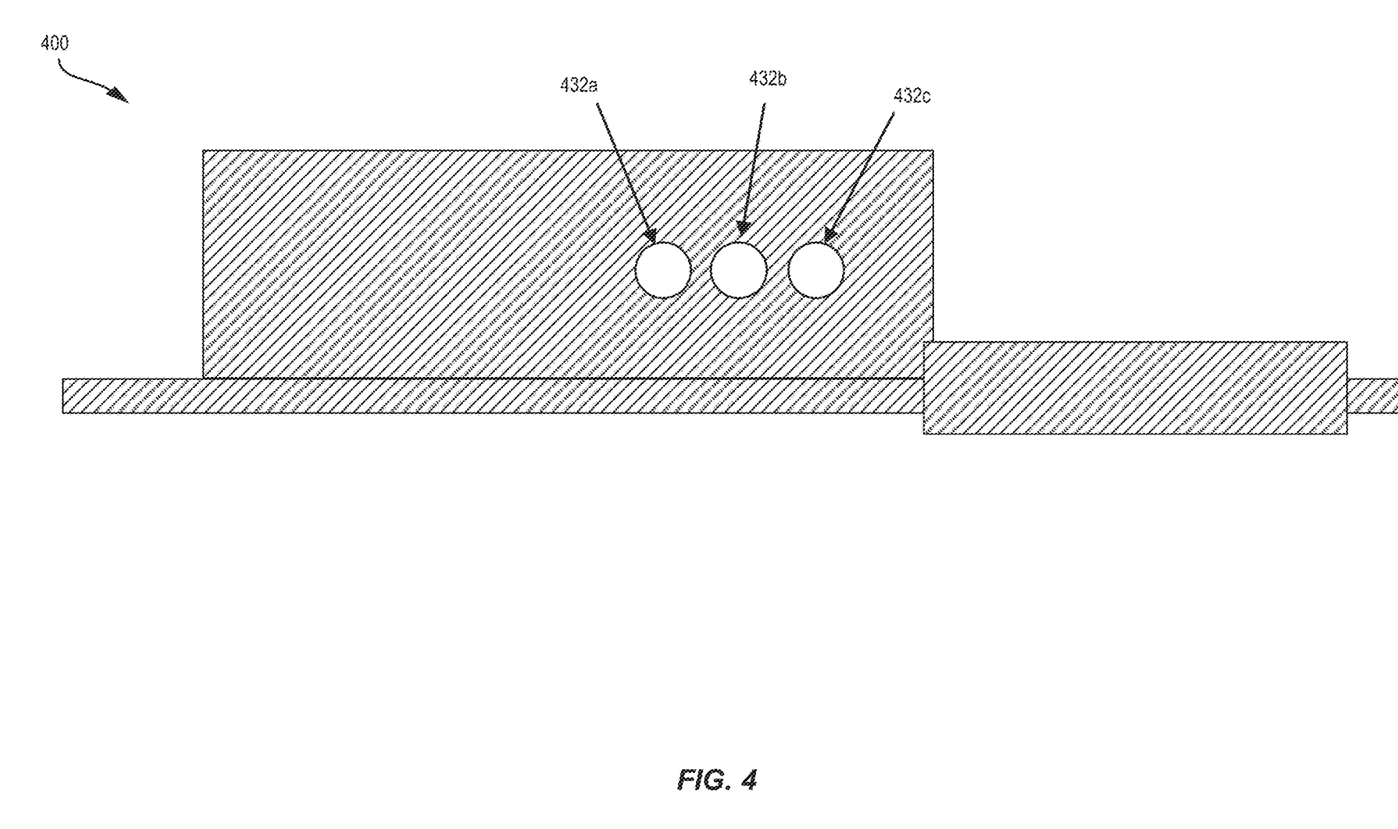
FIG. 4 is a diagram of a control module for an air filtration system, according to one example of the present disclosure.

FIG. 4 is a diagram of a control module for an air filtration system, according to one example of the present disclosure. FIG. 4 depicts control module 400, which includes three indication signals 432a-c each of which can independently indicate a status of a filter or filter module. As one example of indicating a status, the three indication signals 432a-c can independently display a colored light, such as but not limited to a blue or green light that indicates the filter module is "good" or otherwise not near its end of life, an orange or yellow light that indicates the filter module has reached a low life, or a red light that indicates the filter module has reached its end of life. Other examples are possible.

Figure 5:
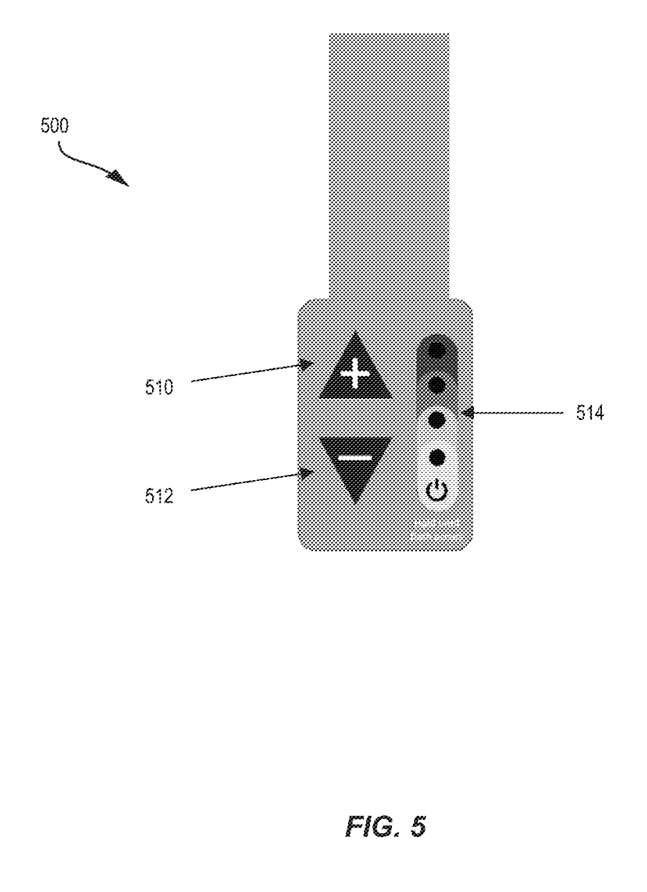
FIG. 5 is a diagram of a control pad of an air filtration system, according to one example of the present disclosure.

FIG. 5 is a diagram of a control pad of an air filtration system according to one example of the present disclosure. FIG. 5 depicts up control 510, down control 512, and slider 514, which allow a user to adjust an operational setting of the filtration system 300. For instance, up control 510 and down control 512 can be configured to adjust the fan speed of fan 320. Slider 514 can be used to turn on or off the system or provide other functionality. As discussed, in some cases, operational parameters obtained from a RFID tag can disable or enable the functionality of up control 510, down control 512, slider 514, and/or any other controls.

When present, the user interface 500 is communicatively coupled to another component of the filtration system 300, such as the control module 330 and/or the fan 320. As one example, the user interface can be coupled to the fan 320, optionally via the control module 330, by wireless or a wired connection. In some examples, the user interface 500 allows a user to turn the filtration system 300 on and off and/or to control at least a subset of the operational settings of the filtration system 300, such as the speed of the fan 320. The user interface 500 can include any suitable controls, buttons, or options, whether accessed directly (e.g. by physically pressing a button) or remotely, to allow a user to control the filtration system 300.

FIG. 6 is a flowchart of a method 600 performed by a filtration system according to one example of the present disclosure. For example purposes, method 600 is discussed with respect to filtration system 100. But method 600 can be performed with respect to filter module 200, filter module 301, and/or filtration system 300.

It should be appreciated that while method 600 is set forth below as including various operations, other sequences of operations may also be performed. For example, the steps outlined below may be performed in a different order. Moreover, the individual steps illustrated by method 600 may include multiple sub-operations that may be performed in various sequences as appropriate to the individual operation. Furthermore, additional operations may be added or removed depending on the particular applications. One of the ordinary skill in the art would recognize many variations, modifications, and alternatives.

At block 602, method 600 involves interrogating, from an RFID access device in a filtration system, a radio-frequency identification (RFID) tag that is positioned on an RFID filter module that is positioned in the filtration system. For example, filter module 101 is positioned proximate to RFID access device 112. Control module 110 (e.g., processing device 114) causes RFID access device 112 to interrogate RFID tag 105. The interrogation can include transmitting, from the RFID access device 112, a signal that causes RFID tag 105 to transmit one or more signals back to RFID access device 112. In other examples, for instance if RFID tag 105 is an active device, then RFID tag 105 can periodically transmit signals, which can be received by RFID access device 112.

At block 604, method 600 involves accessing, in response to interrogating the RFID tag of the RFID filter module, a programmed value of an operational parameter stored on the RFID tag and associated with the filter module of the filtration system. The value is stored on the RFID tag. Continuing the example, control module 110 accesses a programmed value of an operational parameter from RFID tag 105. For example, RFID access device 112 receives a radio signal from RFID tag 105. The radio signal includes the value of the operational parameter, which is processed by processing device 114.

Non-limiting examples of operational parameters include parameters related to fans, for instance: fan speed at startup, fan speed increases over the course of filter life, and whether to start the fan automatically upon system power-up. In one example, a RFID tag is pre-programmed with data indicating a default fan speed(s) to be used with the RFID filter module. Control module 110 interrogates the RFID tag 105. In response, the control module 110 receives an appropriate fan speed to use with the specific filter module 101. The appropriate fan speed can be a specific default fan speed or a variable fan speed that's value is relative to one or more other parameters, such as volume of air to be processed in a given time.

At block 606, method 600 involves adjusting an operational setting of the filtration system based on the accessed programmed value of the operational parameter. Continuing the example, control module 110 adjusts one or more operational settings of the filtration system 100 based on the programmed value of the operational parameter accessed with respect to the RFID tag 105 of the filter module 101. For example, if the programmed value prescribes a fan speed, then control module 110 adjusts the operational setting of fan 120 as prescribed.

At block 608, method 600 involves operating the filtration system based on the adjusted operational setting. Continuing the example, control module 110 operates the filtration system, e.g., fan 120, according to the adjusted operational setting.

In an example, operational parameters include data for determining a fan speed based on desired performance, such as a desired air flow rate (e.g., a volume of air to be processed during a given time period). In this case, the filtration system, or any suitable component thereof, interrogates the RFID tag of the filter module, accesses the data for determining the fan speed, and adjusts the fan speed in accordance with the desired air flow rate or other performance parameter.

In another example, maintaining a desired level of air cleanliness in a first environment, such as an ambulance, requires that the entire volume of air in the vehicle be cleaned up to 20 times per hour, while a similar volume of air in a second environment needs to be cleaned less frequently. Thus, if the same filtration system with the same RFID filter module is used in the first and second environments, a higher fan speed would be required in the first environment than in the second environment. In this example, optionally, the RFID tag includes data indicating various fan speed settings that correspond to different specific operating environments or different specific fluid processing requirements. Control module 110 interrogates the RFID tag 105 of the filter module, accesses the programmed fan speed(s), and sets the fan speed in accordance with the operating environment. Optionally, the operating environment is identified by a user.

Other examples of operational parameters include parameters related to the filter module such as number of operating hours, number of installed hours, minimum or maximum air flow rate (e.g., cubic feet per minute (CFM)), volume of fluid processed after which to warn the user about "low filter life" or "no filter life," operating temperature at which the machine should be turned off to prevent damage, and firmware version.

For example, filtration devices used to purify air in emergency vehicles are usually on and actively filtering air only when the vehicle is in use and may be on only when the vehicle is present in an environment where high concentrations of harmful airborne particulates and other contaminants are known to be present. So, elapsed installed time (i.e., total time measured from installation) is not a sole, reliable measure of a filter module or filtration media's remaining useful life. Additionally, a filter module may operate most efficiently with one set of operational settings in a first environment but with a second set of operational settings in a second environment. When the levels of contaminants where a filtration system is used vary dramatically, such as when the system is mobile, elapsed operational time (total time actually in operation) also is not a reliable measure of the filter's remaining useful life. Accordingly, the RFID tag includes operational parameters that are operational statistics of the corresponding RFID filter module. The statistics include suitable statistics to facilitate complete monitoring capabilities with respect to the effective life of the RFID filter module. For example, the statistics can include a number of designed operating hours, a number of designed installed hours, a cumulative amount of air flow (such as a number of cubic feet of air) which can be processed before the filter is expended, and/or a static pressure curve of the filter.

In another example, if a first RFID filter module includes more carbon media than a second RFID filter module, e.g., for removal of higher levels of VOCs, then the first RFID filter module would produce a higher static pressure as compared to the second RFID filter module. Thus, the first filter module would require a higher fan speed than the second filter module to process the same amount of air in a given time period. To ensure a filtration system processes a desired volume of air within a given time period regardless of which filter module is installed, the RFID tags of the first and second filter modules include data indicating different fan speed settings, with the fan speed setting indicated by the first RFID filter module being higher than that indicated by the second RFID filter module. Accordingly, when control module 110 interrogates and receives data from the RFID tag of the respective filter module, the filtration system sets the fan speed in accordance with the settings on the respective RFID tag.

In another example, a certain environment may have regulations limiting the sound pressure that equipment can produce, which might preclude a filtration system from operating at its most efficient levels. A filtration device that is installed and operated in such an environment might need to include controls to slow the fan speed, air flow rate, etc. to reduce the noise level of the system. Ideally, the system could be adjusted to operate at its ideal setting, as obtained via RFID tag 105, when permissible, and to operate at lower speeds when reduced noise levels are required. In this example, the filtration system adjusts operational settings (e.g., fan speed) to conform to reduced noise level requirements. Additionally, the filtration system is capable of adjusting other settings to conform to other requirements.

In another example, operational parameters can include enabling or disabling a system on or system off control and/or allow or disallow changes on a control pad. In some cases, changes on a control pad can be restricted if the system is in motion (e.g., in a vehicle).

In some cases, operational parameters include performance parameters. Performance parameters can be actual values that indicate the quality of filtration system performance or target value that are recommended or suggested parameters for the filtration system to meet. The air filtration system can measure actual performance parameters for comparison against target performance parameters. Examples of performance parameters include a static pressure drop across the filter module, a change in air flow across the filter module, an air purity, and/or other suitable performance parameters. In some examples, these performance parameters are unique to the filter module. For example, a first RFID filter module includes a first static pressure drop, and a second RFID filter module includes a second static pressure drop. Additionally, a target is desired or otherwise selected based on characteristics of a location or space in which the filter module is intended to function. Accordingly, in one example, the control module 110 considers a static pressure curve of the filter and selects the correct fan speed for delivering a target air flow volume.

Accordingly, in one example, a sensor or other component of a filtration system monitors one or more performance parameters (such as a pressure drop across the RFID filter module), and control module 110 interrogates the RFID tag to identify a relevant target performance parameter (such as the target pressure drop). If the measured performance parameter differs from the target performance parameter, the filtration system provides an indication of the difference and/or automatically adjusts an operational setting (such as a fan speed) to align the measured performance parameter with the target performance parameter. In this way, the RFID filter module enables the filtration system to identify, and optionally improve, inefficient or ineffective filtration.

Optionally, RFID tag 105 includes information to facilitate detection of tamper or fraud. For example, RFID tag 105 can include a key, or unique ID, that is read-only. This key can be generated at manufacturing time. Additionally, RFID tag 105 can have one or more data values stored thereon. Any of these data value scan include data representing a unique ID. When the unique ID of the RFID tag 105 matches the unique ID of the data, the control module can validate the RFID tag 105 as authentic and verify the validity of data on RFID tag 105. This enables verification that the data has not been altered by a third party. If the unique ID of the RFID tag does not match the ID included in the data, the control module 110 rejects the data.

Additionally or alternatively, the control module 110 can compare the style, presentation, or other suitable parameter of data written on the RFID tag 105 to pre-programmed data included on the control module 110, and, if the style, presentation, or other suitable parameter does not match that of the pre-programmed data, the control module 110 rejects the filter data. Optionally, each field in the filter data includes a different key that is required to match an existing key or that may be required to be entered prior to accepting or unlocking the filter data.

In some examples, the control module 110 includes one or more maximum or minimum default operational settings of the filtration system that may not be overridden. Accordingly, in some cases, control module 110 overrides a pre-existing operational setting of the filtration system 100 and applies the operational setting received from the RFID tag. In other cases, however, the received or determined operational setting for the RFID filter module exceeds a maximum or minimum setting of the filtration system 100 that may not be overridden. In those cases, the control module 110 overrides the corresponding pre-existing operational setting of the filtration system 100 and applies the maximum or minimum setting as applicable.

In another example, if the operational parameter(s) indicate that the installed filter module 101 has reached the end of life of the filter module 101 (e.g., that the filter module 101 is expired or expended), the control module 110 accordingly adjusts the operational settings of the filtration system 100. For example, control module 110 can cause an audible indicator to be emitted, signaling that the filter module 101 is expired or expended. Additionally or alternatively, the control module 110 can display a visual indicator (e.g., the indication signal 220c) that the filter module 101 is expired or expended. The control module 110 also can prevent operation of the filtration system 100 while the expired or expended filter module 101 remains installed.

The time to the end of life of the filter module 101 can be measured or determined based on various diagnostic data (e.g., performance parameters or statistics) that can be measured or tracked by the filtration system 100 and optionally stored on the RFID tag 105. Such diagnostic data can include, but is not limited to, operational parameters such as a number of operational hours of the filter module 101, an installation time of the filter module 101, a total cumulative volume of fluid processed by the filter module 101 (e.g., in total cubic feet), or a combination thereof. The number of operational hours of the filter module 101 includes an amount of hours that the filtration system 100 operates while the filter module 101 is installed. The installation time of the filter module 101 includes an amount of time (e.g., hours, days, weeks, months, etc.) that the filter module 101 is installed in a fluid purifier such as the filtration system 100. The cumulative volume of fluid processed by the filter module 101 includes a volume of fluid, such as cubic-feet or liters, cleaned or otherwise processed by the filtration system while the filter module 101 is installed.

Accordingly, in some examples, the control module 110 interrogates or otherwise communicates with the RFID tag 105 for writing or storing measured or tracked diagnostic data to the RFID tag 105. Optionally, that step is repeated periodically (e.g., every minute, every few minutes, etc.) during operation of the filtration system Optionally, the technique for measuring the time to the end of life of the filter module 101 is selectable by the filtration system or by a user. As one example, a user of the filtration system 100 selects via the control module 110 or a user interface (not depicted), the technique for determining the end of life of the filter module 101. In some examples, the technique is instead a combination of techniques. In some examples, the filtration system 100 or the control module 110 selects an indication, such as but not limited to, a good life, low life, and/or end of life indication, based on operational parameters stored on the RFID tag 105 and displays that indication, for example on the control module 110. Optionally, the filtration system 100 or the control module 110 may use the amount of elapsed installed time or elapsed operational time of the filter module 101 to select the indication to display for low life or end of life of the filter module 101. The indication of the remaining life of the filter module 101 can include a percentage value of the end of life of the filter module 101. For example, the low life indication of the filter module 101 may be 17%, 18%, 19%, or other suitable percentages of remaining life of the end of life of the filter module 101.

Figure 7:
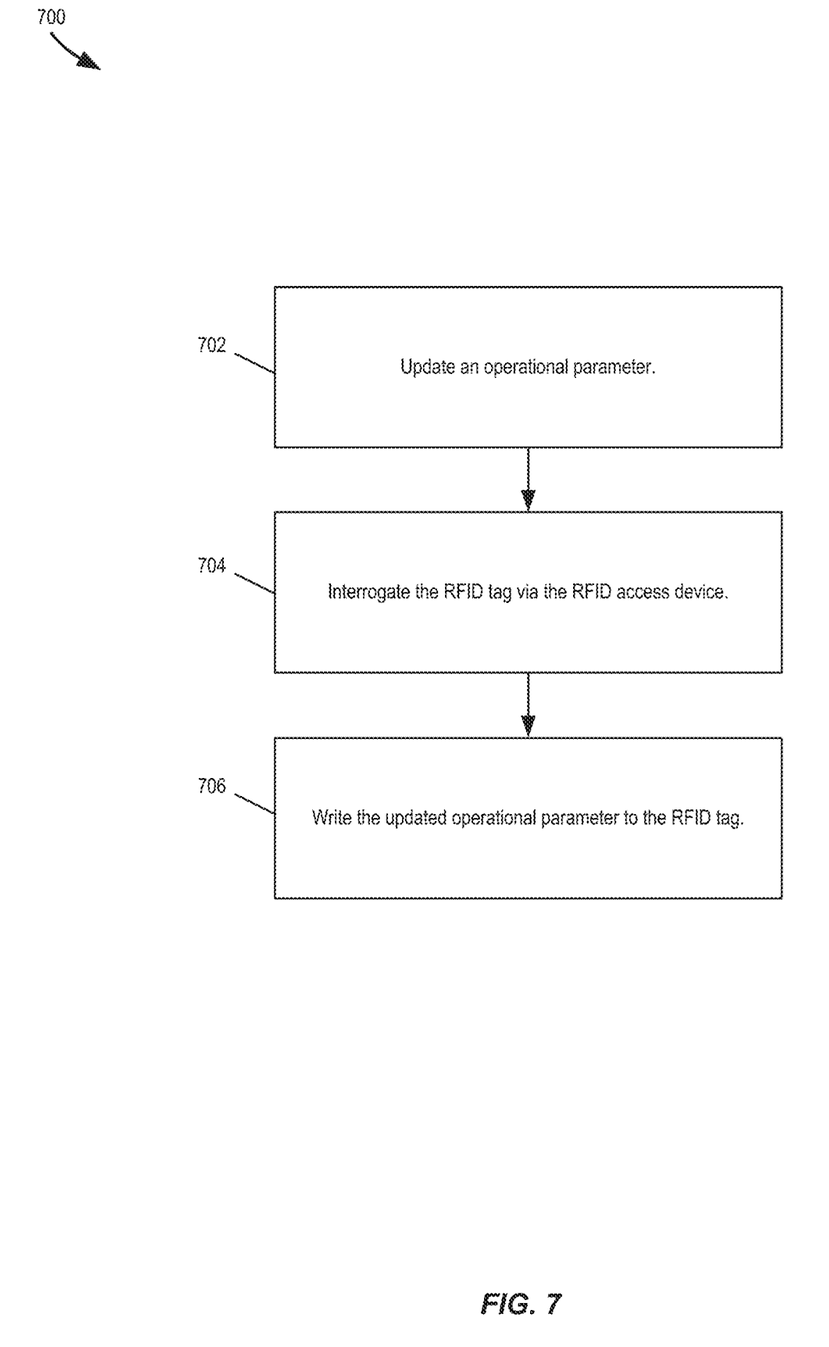
FIG. 7 is a flowchart of a process performed by the air filtration system, according to one example of the present disclosure.

FIG. 7 is a flowchart of a process performed by an air filtration system according to one example of the present disclosure. It should be appreciated that while method 700 is set forth below as including various operations, other sequences of operations may also be performed. For example, the steps outlined below may be performed in a different order. Moreover, the individual steps illustrated by method 700 may include multiple sub-operations that may be performed in various sequences as appropriate to the individual operation. Furthermore, additional operations may be added or removed depending on the particular applications. One of the ordinary skill in the art would recognize many variations, modifications, and alternatives.

At block 702, method 700 involves updating an operational parameter. As an example, processing device 114 updates an operational parameter.

At block 704, method 700 involves interrogating the RFID tag with the RFID access device. At block 704, processing device 114 performs similar operations as performed at block 602 of method 600.

At block 706, method 700 involves writing, to the RFID tag, the updated operational parameter. Continuing the example, processing device 114 causes RFID access device 112 to write the updated operational parameter to RFID tag 105. Examples of data that can be written to the RFID tag include a firmware version of a machine in which the RFID filter module was installed, a date the filter module was first used, elapsed operating hours, elapsed installed hours, and air flow processed In some examples, diagnostic data (such as, but not limited to, one or more performance parameters) is received from the RFID tag 105, derived from data from RFID tag 105, written to the RFID tag 105, or a combination thereof. The diagnostic data can include an average amount of time the filtration system 100 runs within a predetermined time window (e.g., 24 hours, etc.), an identification of the filtration system 100 in which the filter module 101 is or was installed, total elapsed operating time (e.g., hours) for the filter module 101, elapsed installed time (e.g., hours) for the filter module 101, designed filter module lifetime in terms of installed hours and/or operating hours, other suitable diagnostic data, or any suitable combination thereof. The diagnostic data is recorded or otherwise written to the RFID tag 105 by the control module 110 or other suitable component of the filtration system 100. Additionally or alternatively, the diagnostic data is read or otherwise determined from the RFID tag 105 using the control module 110, other suitable component of the filtration system 100, a remote interrogation device that determines data from the RFID tag 105, or any suitable combination thereof.

FIG. 8 illustrates an exemplary computing device for use in a control module of an air filtration system, according to one example of the present disclosure. Any suitable computing device may be used for performing the operations described herein. The depicted example of a computing device 800 includes a processor 802 communicatively coupled to one or more memory devices 804. The processor 802 executes computer-executable program code 830 stored in a memory device 804, accesses data 820 stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices or cores, including a single processing device. The functionality of the computing device may be implemented in hardware, software, firmware, or a combination thereof.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 800 may also include a number of external or internal devices, such as input or output devices. For example, the computing device 800 is shown with one or more input/output ("I/O") interfaces 808. An I/O interface 808 can receive input from input devices or provide output to output devices. One or more busses 806 are also included in the computing device 800. The bus 806 communicatively couples one or more components of a respective one of the computing device 800.

The computing device 800 executes program code 830 that configures the processor 802 to perform one or more of the operations described herein. For instance, processor 802 can perform the operations described with respect to methods 600 and 700.

The computing device 800 also includes a network interface device 810. The network interface device 810 includes any device or group of devices suitable for establishing a wired or wireless data connection to one or more data networks. The network interface device 810 may be a wireless device and have an antenna 814. The computing device 800 can communicate with one or more other computing devices implementing the computing device or other functionality via a data network using the network interface device 810.

The computing device 800 can also include NFC access device 816. NFC access device 816 is coupled to antenna 818. NFC access device 816 can employ any NFC, RFID, or similar technology to access (read and/or write) NFC devices. For instance, NFC access device 816 can read data from or write data to an RFID tag (e.g., RFID tag 105 or 205) that is placed in proximity to antenna 818.

NFC access device 816 can access active or passive NFC devices. In an example, NFC access device 816 can cause antenna 818 to transmit a signal to a NFC tag. In the case of a passive NFC tag, the signal contains an amount of energy that is sufficient to energize the NFC tag. In turn, the NFC tag transmits a response, which is received by antenna 818.

The computing device 800 can also include a display device 812. Display device 812 can be a LCD, LED, touch-screen or other device operable to display information about the computing device 800. For example, information could include an operational status of the computing device, network status, etc. In an example, filtration system 300 can include display device 812.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A method comprising:
   interrogating, from a radio-frequency identification (RFID) access device in a filtration system, a RFID tag that is positioned on a filter module that is positioned in the filtration system;
   accessing, in response to interrogating the RFID tag, a value of an operational parameter of the filtration system, wherein the value comprises an operational speed of a fan in the filtration system and is stored on the RFID tag and associated with the filter module;
   adjusting a value of an operational setting of the filtration system based on the stored value of the operational parameter, wherein the operational setting comprises the operational speed of the fan; and
   operating the filtration system based on the adjusted value of the operational setting.

2. The method of claim 1, wherein the interrogating comprises transmitting, to the RFID tag, a first signal that energizes the RFID tag, wherein the accessing comprises receiving a second signal comprising the stored value of the operational parameter.

3. The method of claim 1, further comprising:
    determining an existing value of an additional operational parameter of the filtration system;
    interrogating, for an additional time, the RFID tag via the RFID access device; and
    writing, to the RFID tag, the existing value of the operational parameter as an updated value of the additional operational parameter.

4. The method of claim 3, wherein the additional operational parameter is a remaining shelf life of the filter module or a remaining use time of the filter module, and wherein the updated value of the additional operational parameter is (i) an updated shelf life of the filter module or (ii) an updated remaining use time of the filter module.

5. The method of claim 4, further comprising disabling a device of the filtration system in response to determining that the updated value of the additional operational parameter is equal to a minimum or a maximum value, is lower than the minimum value, or exceeds the maximum value.

6. The method of claim 1, wherein the operational parameter further includes a runtime of the fan in the filtration system.

7. The method of claim 1, wherein the operational parameter further includes an elapsed installed time of the filter module, an elapsed operational time of the filter module, or a remaining useful life of the filter module.

8. The method of claim 1, further comprising:
    interrogating, for an additional time and from the RFID access device, the RFID tag;
    accessing, from the RFID tag, a target value of a performance parameter of the filtration system;
    determining that a measured value of the performance parameter differs from the target value of the performance parameter; and
    responsive to determining that the measured value of the performance parameter differs from the target value of the performance parameter, further adjusting the value of the operational setting of the filtration system to cause the measured value of the performance parameter to approximate the target value of the performance parameter.

9. The method of claim 8, wherein the performance parameter includes a pressure drop across the filter module, an airflow rate of air across the filter module, a measurement of air purity across the filter module, or a static pressure drop across the filter module.

10. The method of claim 1, further comprising: in response to the interrogating, unlocking one or more features of the filtration system.

11. A filtration system comprising:
    a housing having an opening sized to receive a radio-frequency identification (RFID) filter module,
    the filter module comprising a filtration media and an RFID tag;
        an RFID access device communicatively couplable to the RFID tag and positionable proximate to the opening for receiving the RFID filter module, for interrogating the RFID tag;
        a device configured to operate at least one function of the filtration system; and
        a processor configured to perform operations comprising:
            causing the RFID access device to interrogate the RFID tag;
            accessing, in response to interrogating the RFID tag, a stored value of an operational parameter of the filtration system, wherein the value comprises an operational speed of a fan in the filtration system and is stored on the RFID tag and associated with the filtration media; and
            adjusting a value of an operational setting of the device based on the stored value of the operational parameter, wherein the operational setting comprises the operational speed of the fan.

12. The filtration system of claim 11, wherein the device is the fan, and wherein the fan is operable to cause air to pass through the filter module.

13. The filtration system of claim 11, wherein the interrogating comprises transmitting, to the RFID tag, a first signal that energizes the RFID tag, wherein the accessing comprises receiving a second signal comprising the stored value of the operational parameter.

14. The filtration system of claim 11, wherein the operations further comprise:
    determining an existing value of an additional operational parameter of the filtration system;
    interrogating the RFID tag via the RFID access device; and
    writing, to the RFID tag, the existing value of the additional operational parameter as an updated value of the additional operational parameter.

15. The filtration system of claim 14, wherein the additional operational parameter further includes a remaining shelf life of the filter module or a remaining use time of the filter module, and wherein the updated value of the additional operational parameter further includes (i) an updated shelf life of the filter module or (ii) an updated remaining useful life of the filter module.

16. The filtration system of claim 14, wherein the processor is configured to perform operations comprising disabling a device of the filtration system in response to determining that the updated additional operational parameter has been exceeded.

17. The filtration system of claim 11, wherein the operational parameter further includes a runtime of the fan in the filtration system.

18. The filtration system of claim 11, wherein the operational parameter further includes an elapsed installed time of the filter module, an elapsed operational time of the filter module, or a remaining useful life of the filter module.

19. The filtration system of claim 11, where the operations further comprise:
    interrogating, from the RFID access device, the RFID tag;
    accessing, from the RFID tag, a target value of a performance parameter of the filtration system; and
    responsive to determining that a measured value of the performance parameter differs from the target value of the performance parameter, adjusting the value of the operational setting of the filtration system to cause the measured value of the performance parameter to approximate the target value of the performance parameter.

20. The filtration system of claim 19, wherein the performance parameter includes a pressure drop across the filter module, an airflow rate of air across the filter module, a measurement of air purity across the filter module, or a static pressure drop across the filter module.

21. The filtration system of claim 11, wherein the operations further comprise: in response to the interrogating, unlocking one or more features of the filtration system.

22. A system comprising:
a filter module comprising filtration media and a Near Field Communication (NFC) tag that includes one or more operational parameters relating to the filter module; and
a filtration system comprising:
  a housing having an opening sized to receive the filter module;
  an NFC access device communicatively couplable to the NFC tag and positionable proximate to the opening for receiving the filter module, for interrogating the NFC tag;
  a device configured to operate at least one function of the filtration system; and
  a processor configured to perform operations comprising:
    causing the NFC access device to interrogate the NFC tag;
    accessing, in response to interrogating the NFC tag, a stored value of an operational parameter of the filtration system, wherein the value comprises an operational speed of a fan in the filtration system and is stored on the NFC tag and associated with the filter module;
    adjusting a value of an operational setting of the device based on the stored value of the operational parameter, wherein the operational setting comprises the operational speed of the fan; and
    operating the device based on the operational parameter.

* * * * *